July 31, 1956 M. E. BOURNS ET AL 2,756,777
MULTIPLE CAPSULE BELLOWS
Filed April 24, 1953
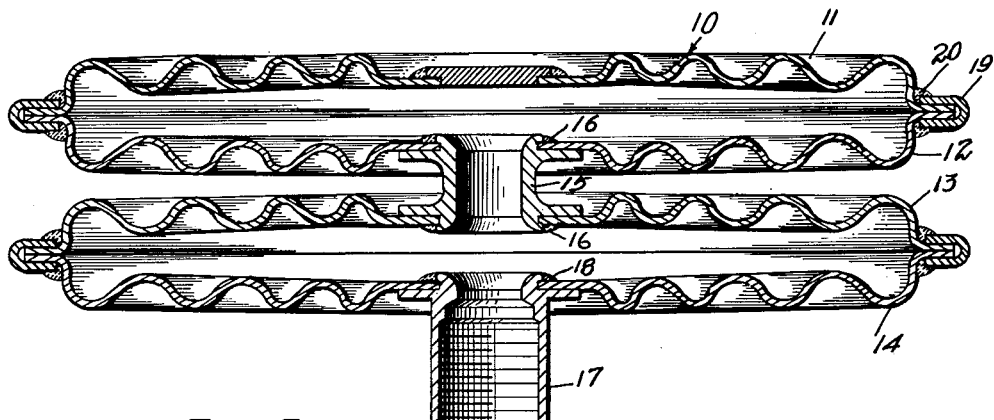
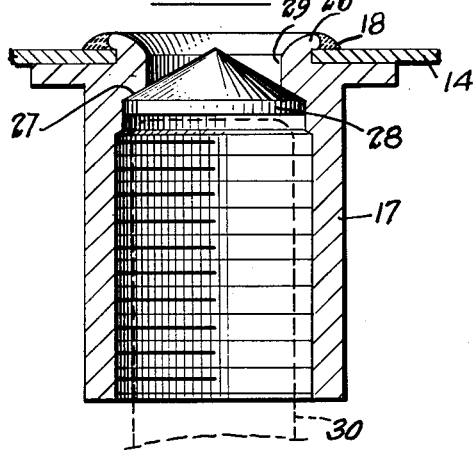
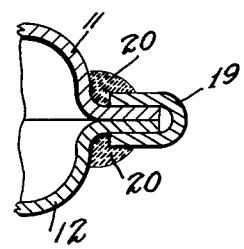
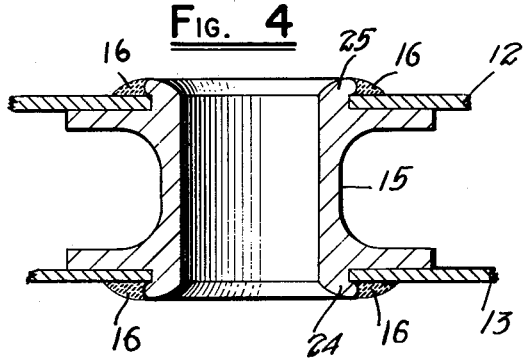
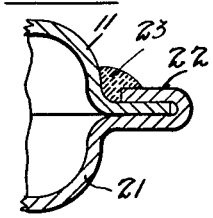
INVENTORS
MARLAN E. BOURNS
MARVIN E. HARRISON
BY
ATTORNEYS

United States Patent Office 2,756,777
Patented July 31, 1956

2,756,777

MULTIPLE CAPSULE BELLOWS

Marlan E. Bourns and Marvin E. Harrison, Riverside, Calif.; said Harrison assignor to said Bourns Application April 24, 1953, Serial No. 350,992

1 Claim. (Cl. 137—796)

This invention relates to a bellows and more particularly to a precision bellows made of several individually formed wafers joined together at their edges to form a capsule. In the preferred embodiment, a pair of said capsules is joined together at their centers to form a completed bellows.

In making pressure responsive devices such as gauges, meters, pick-ups or transducers, it is frequently desirable to use a bellows which expands or contracts in response to the application of pressure on the inside or outside of the bellows. It is customary to make bellows of this type by pressing circular discs having concentric ribs therein to make the wafers more flexible. These wafers are customarily assembled into capsules and the capsules stacked to form the bellows. Conventionally, such wafers are merely soldered together at the flanges which form the outer edges thereof and also it is conventional to simply solder the spacers which separate the capsules to the central openings thereof.

In the event it is desired to evacuate the bellows so as to provide a measure of absolute pressure, as in the case of a barometer or altimeter, it is customary to perform the evacuation of the bellows by attaching a small tube to the bellows, evacuating the inside of the bellows through this tube which is thereupon pinched off and soldered. The small tube is then conventionally wrapped into a convenient position after being used for the evacuation. Another method of evacuating such a bellows is to place the entire bellows in a Bell jar, evacuating the Bell jar so that the interior of the bellows becomes evacuated through a small hole in the bellows and then covering the small hole with solder.

The disadvantages of the above-described methods of construction are that leakage frequently occurs around the outer edges of the wafers at the solder junction and also at the inner junctures where the spacers are soldered between the wafers. Furthermore, in the event of high internal pressure, the bellows frequently pull apart either at the junction of the outside rims which are held together only by soft solder or at the central spacers. In addition, if the instrument is subjected to vibration, the mass of the bellows and the attached linkage frequently is sufficient to break the entire bellows assembly apart at one or the other of the junctures.

In evacuating such a bellows, several difficulties are frequently encountered. The small tube above referred to frequently becomes damaged, ruining the bellows. The small tube, after having been pinched off and sealed, is surplusage.

Such a small tube provides only a small opening through which it is difficult and time consuming to pull a good vacuum since the molecules become scarce as the vacuum becomes high, making it difficult and a lengthy process to secure a high vacuum inside the bellows.

Furthermore, when working inside a bell jar, it is frequently difficult to cause the solder to flow properly over the small hole. This small soldering hole also provides a potential source of leakage.

With these difficulties in mind, it is an object of this invention to provide a bellows having an improved seal around the outer edges of the wafers and at the center portions where the wafers are joined to the spacers.

It is a further object of this invention to provide a bellows which will withstand high internal pressure without pulling apart either at the junction of the rims of the wafers or at the central portion where the wafers are joined to the spacers.

It is a further object of this invention to provide bellows which will withstand vibration and acceleration such as is encountered in aircraft and guided missiles without breaking the wafers apart at any of the junctures.

It is a further object of this invention to provide a bellows which may be readily evacuated to a high vacuum and which has a large enough opening to permit all foreign material and moisture to readily be driven out of the interior of the bellows prior to the evacuation process. Such large opening facilitates the pulling of a high vacuum on the bellows.

It is a further object of this invention to provide sealing means for an evacuated bellows which may be readily soldered in place and which is protected from mechanical damage after the bellows has been in use.

These and other features, objects and advantages will be apparent from the annexed specification in which:

Figure 1 is a vertical section of a bellows formed in accordance with the present invention.

Figure 2 is an enlarged fragmentary section showing one embodiment of the method of attaching the rims of the wafers together.

Figure 3 is a view similar to Figure 2, showing another embodiment of the method of attaching the wafers together.

Figure 4 is an enlarged fragmentary section showing the method of attaching the wafers to the spacer.

Figure 5 is an enlarged fragmentary section showing the method of sealing the tapered plug to an evacuated bellows.

Referring now more particularly to the drawings, there is shown a bellows indicated generally by the numeral 10 which is composed of four wafers 11, 12, 13 and 14, forming a pair of capsules. The wafers are circular disks of sheet metal having a series of concentric corrugations formed therein, said corrugations increasing in depth as their diameter increases. The wafers 12 and 13 are attached to a spacer 15 by means of spinning or riveting and also by soldering as shown at 16. The wafer 14 is next attached to the stem or fitting 17 by means of spinning and soldering as shown at 18. The outer edges of the bellows wafers are then tinned and the entire bellows is assembled. A split ring 19 is then attached over the outer flanges or rim portions of the wafers and clamped thereto and then soldered as shown at 20.

Referring particularly to Figure 2, it will be seen that the split ring 19 is formed in such a manner that it slides over the flanges of the wafers 11 and 12 or 13 and 14 and seals them firmly both mechanically and by reason of the soldering 20. This adds great strength to this juncture by reason of the fact that the wafers are held together mechanically and not simply by the tension of the solder.

Referring to Figure 3, there is illustrated an alternative embodiment of the method of making this juncture. In this embodiment, a wafer 21 having an extended rim is utilized. The edge of this extended rim is rolled over the rim of the wafer 11 forming a mechanical seal 22 which is then soldered as at 23.

Referring to Figure 4, there is illustrated the method of attaching the wafers 12 and 13 to the spacer 15. The wafers 12 and 13 are attached to the spacer 15 by means of riveting or spinning as shown at 24 and 25, and these areas are then subsequently soldered as at 16 to seal them.

Referring to Figure 5, the stem 17 is shown as attached to the wafer 14 by spinning or riveting as at 26 and soldering as at 18. This stem 17 is provided with a tapered seat 27 on the interior thereof and a tapered plug 28 is provided. The entire bellows may be placed in a bell jar with the plug 28 free from the seat 27 but tinned with solder and in contact with a heating element, which is shown in dotted lines in Figure 5, and designated by the reference numeral 30. The bellows is then evacuated through the large opening 29, and this opening is then closed by ramming the plug 28 home upon the seat 27 and soldering it thereto. It will be noted that the plug 28 is completely housed within the stem 17 and thereby protected from mechanical damage.

While there has been described what are at present considered preferred embodiments of the present invention, it will be appreciated by those skilled in the art that various changes and modifications can be made therein without departing from the essence of the invention and it is intended to cover herein all such changes and modifications as come within the true spirit and scope of the appended claim.

We claim:

A bellows comprising at least two capsules which are interconnected by a tubular spacer, each of said capsules comprising a pair of thin metal wafers, each formed with a series of concentric corrugations and having radially projecting rim portions which lie flat against the rim portion of the adjoining wafer, a ring of U-shaped cross-section encircling said rim portions and clamping the same together, the adjacent wafers of said two capsules being apertured centrally to receive said tubular spacer, and the outer wafer of one of said capsules being apertured centrally to receive a tubular stem, said spacer being riveted at its ends to the edges of said central apertures in said adjacent wafers, said tubular stem being riveted at one end to the edge of said central aperture in said outer wafer, said tubular stem being formed with a recessed conical seat, and a tapered plug seated in said conical seat and soldered thereto.

References Cited in the file of this patent
UNITED STATES PATENTS

| | | |
|---|---|---|
| 995,444 | Dillon | June 20, 1911 |
| 1,045,791 | Hodge | Nov. 26, 1912 |
| 1,117,639 | Cooey | Nov. 17, 1914 |
| 1,198,134 | Kercher | Sept. 12, 1916 |
| 1,275,647 | Bjerre | Aug. 13, 1918 |
| 1,367,792 | Arbuckle | Feb. 8, 1921 |
| 1,533,173 | Egloff | Apr. 14, 1925 |
| 1,717,196 | Emmet | June 11, 1929 |
| 1,819,987 | Hodge | Aug. 18, 1931 |
| 1,830,780 | Brennan | Nov. 10, 1931 |
| 2,061,761 | Gaiser | Nov. 24, 1936 |
| 2,071,583 | Schutt | Feb. 23, 1937 |
| 2,621,397 | Black | Dec. 16, 1952 |